United States Patent [19]

Ditson

[11] 4,016,801
[45] Apr. 12, 1977

[54] METHOD FOR FORMING THREADS
[75] Inventor: J. D. Ditson, Asbury, N.J.
[73] Assignee: Ingersoll-Rand Company, Woodcliff Lake, N.J.
[22] Filed: Sept. 30, 1974
[21] Appl. No.: 510,478
[52] U.S. Cl. ............................ 90/11.42; 76/108 A; 90/11.64
[51] Int. Cl.$^2$ .......................................... B23C 3/32
[58] Field of Search .......... 90/11.42, 11.62, 11.64, 90/11.58, 11.4, DIG. 4; 76/5 R, 108 R, 108 A

[56] References Cited
UNITED STATES PATENTS

| 2,691,921 | 10/1954 | Burgsmueller | 90/11.64 |
| 3,209,652 | 10/1965 | Burgsmueller | 90/11.42 |

Primary Examiner—Othell M. Simpson
Assistant Examiner—Z. R. Bilinsky
Attorney, Agent, or Firm—Walter C. Vliet

[57] ABSTRACT

A method for cutting continuous non-symmetrical threads on a cylindrical workpiece by a modified process of thread whirling. Variations of the thread form are accomplished by skewing the axis of the whirling tool relative to the axis of the cylindrical workpiece and the whirling axis offset. One practical form of resulting thread is of the reverse buttress type useful for drill rod steel.

6 Claims, 4 Drawing Figures

METHOD FOR FORMING THREADS

BACKGROUND OF THE INVENTION

This invention relates to a method for forming threads on a workpiece and more particularly, to a method of producing non-symmetrical thread forms by modification of the process known as thread whirling.

Prior to the present invention, many well-known techniques have been employed to form threads. These techniques employed various machines which ranged from a relatively simple engine lathe to sophisticated milling and thread hobbing machines. Generally, such techniques have the disadvantage that several passes of the cutting tool over the workpiece are required to form the final thread configuration.

This repetition of operations can result in a time consuming and expensive method of cutting threads. If a single longitudinal pass of the cutting tool over the workpiece is used, forming time can be greatly reduced. Another disadvantage of prior techniques is that threads cannot be cut in very hard material. It is necessary to cut the thread and then harden the material.

In order to form a thread on hardened metals with a single longitudinal pass of the tool over the workpiece a technique sometimes referred to as "thread whirling" has been developed. In this method of cutting threads on a workpiece, the cutting tool is in continuous circular cutting contact with the workpiece to thereby permit the cutting of harder metals than is possible with other thread cutting techniques. In "thread whirling" the cutting tool is rotated at a high speed on an axis which is parallel and eccentric to the axis of the workpiece. Relative rotation is established between the workpiece and the cutting tool so that the circular path of the cutting tool orbits about the workpiece at a slower speed. The cutting tool is advanced along the length of the workpiece in spaced relation to the relative movement between the workpiece and the cutting tool so that a thread is formed. The pitch of the groove cut by each revolution of the cutting tool is a small fraction of the pitch of the formed thread. The resultant thread has a smooth surface not readily obtainable with other methods of cutting threads.

SUMMARY

It is the principal object of this invention to provide a method for forming a non-symmetrical thread on a workpiece.

It is another object of this invention to provide a modified thread whirling method to accomplish a non-symmetrical thread of the reverse buttress type.

It is another object of this invention to provide a relatively simple and commercial method for forming threads on a hardened metal or other machinable workpieces.

It is another object of this invention to provide a selectively detachable screw thread rod and coupling system.

In general, the foregoing and other objects are obtained by providing a method of generating a continuous non-symmetrical thread on a cylindrical workpiece by a modified process of thread whirling comprising: rotating the workpiece about a first axis corresponding to the axis of the workpiece; making a continuous cut around a surface of said cylindrical workpiece by means of a tool rotating about a second axis offset from and non-parallel to said first axis, and effecting relative linear motion between said workpiece and said rotating tool parallel to said first axis and in timed relationship with the rotation of said workpiece.

BRIEF DESCRIPTION OF DRAWINGS

The invention will be described in connection with the annexed drawings wherein.

DESCRIPTION OF THE EMBODIMENT

Figure 1:
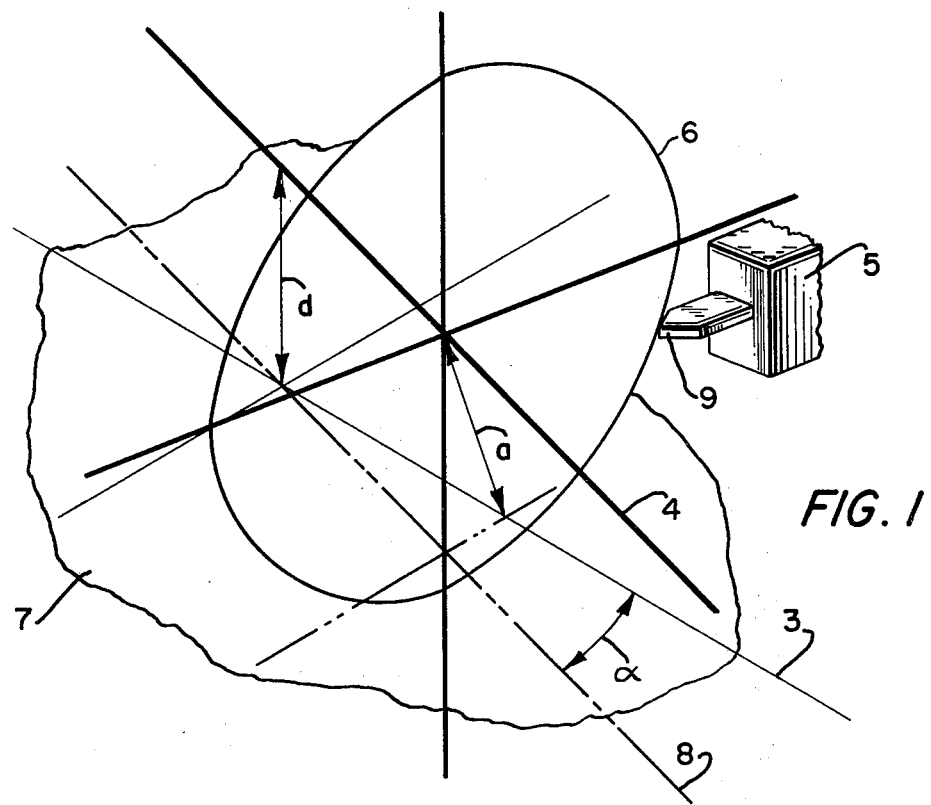
FIG. 1 is a schematic illustration of the essential elements required or accomplishing the method of this invention.

In FIG. 1 axis of whirl 4 is an axis about which the whirling tool 5 rotates and extends perpendicular to the plane 6 in which the tool rotates. The thread axis 3 is the longitudinal axis of the thread to be formed. It may also coincide with the axis of the workpiece where the thread is to be symmetrical about the axis of the workpiece, as is the usual case of a thread disposed on a cylindrical rod or pipe.

Thread axis plane 7 is a plane passing through the thread axis 3 about which the thread is to be generated and parallel to the axis of whirl when the axis of whirl 4 is not parallel to the thread axis 3.

Whirling axis offset (d) is the perpendicular distance from the whirling axis to the thread axis plane.

Whirling offset (a) is the perpendicular distance from the thread axis to the center of rotation of the whirling tool.

The perpendicular projection of the whirling axis onto the thread axis plane will result in a trace line 8 at an angle α with the thread axis 3. This resulting angle is known as "skew angle."

By variation of skew angle α, whirling offset (a) and whirling axis offset (d) various thread forms can be generated. Each variable contributes a separate characteristic to the form, and can be independently varied to produce desired results.

The rod to be threaded is rotated about axis 3. The whirling tool 5 is shown rotating about whirling tool axis 4. The whirling tool contains a cutting bit 9 which contacts the outer surface of rod and is rotated circularly about axis 4, incompassing the thread on the rod about axis 3 and which is offset from axis 3.

In the case of conventional thread whirling for producing symmetrical thread forms, axis 3 is parallel to axis 4. The present invention teaches that a non-symmetrical thread form may be generated by tilting the offset whirling axis at an angle to that of the rod axis.

In both the prior art method and the present method, the thread whirling tool and/or the rod is moved relative to each other linearly along the axis of the rod. The rod is simultaneously rotated as it is fed into the whirling tool, such that the tool bit is in constant cutting contact with the rod with varying depth. The whirling tool cuts a circular path as it progresses and the combination of offset and feed rate of the relative motion between the rod and the whirling tool cooperate to produce a threaded form. In this method the thread is formed by the surface of revolution of a point cutting tool. The resulting thread form is smooth and the cutting tool need not be pre-shaped or formed to the thread configuration for proper results. Unless a special flattening of the external edge of the thread is desired, the point cutting tool is always in contact with the workpiece. That is, the whirling axis offset will not exceed one-half the thread depth.

In the present invention the skewing or tilting of the whirling tool axis relative to the rod axis produces a non-symmetrical thread form.

Figures 2, 3, 4:
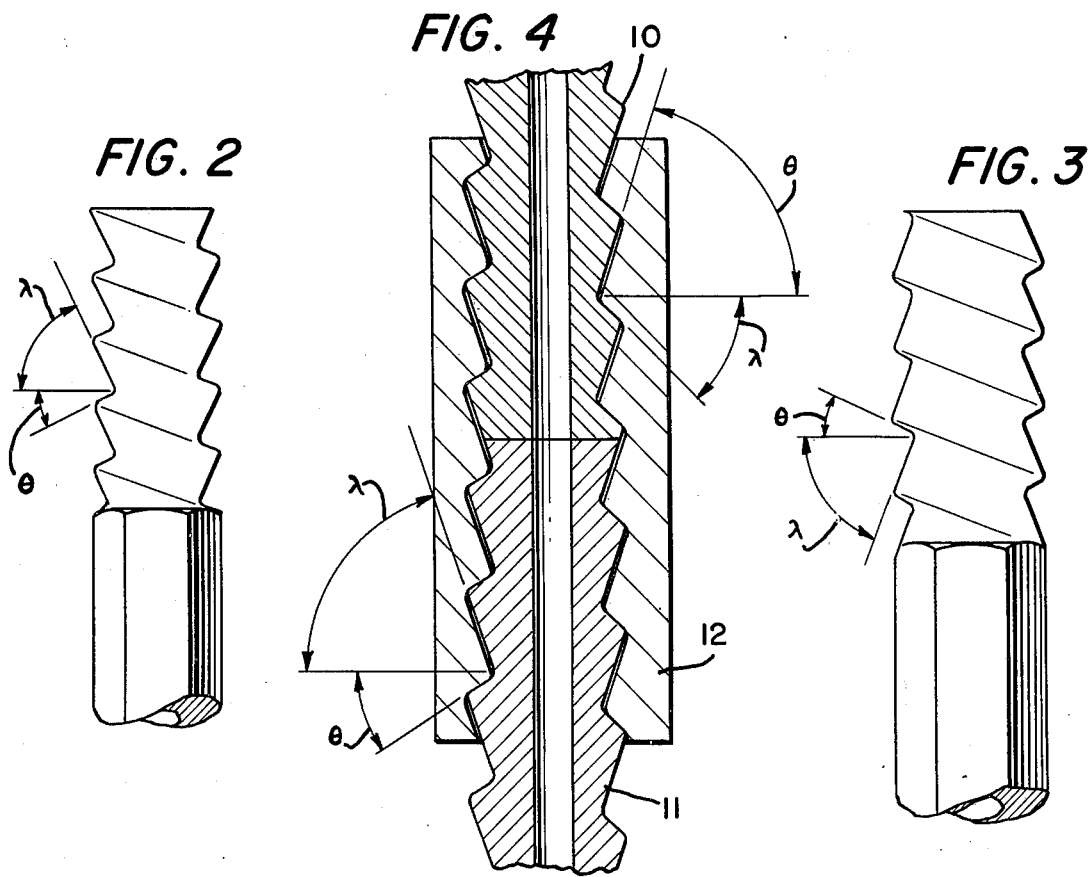
FIG. 2 shows a portion of a drill rod with the thread form achieved by the method of this invention.
FIG. 3 shows a portion of a drill rod having a second thread form achieved by the method of this invention.
FIG. 4 is a sectional view of a portion of two (2) drill rods and a coupling showing the contour of the threads accomplished by the method of this invention.

FIG. 2 shows a section of drill rod 10 with the thread form achieved by the method of this invention. It can be seen that the locking flank angle λ and the clearance flank angle σ of the reverse buttress thread are achieved by the degree of skewing α. By changing the direction of skewing relative to the progression direction of the thread, reversal of the relative magnitude of the locking flank angle λ and the clearance flank σ angle is obtained as shown in FIG. 3. The resulting machined form is still circular in cross section in the plane of whirl. However, a cross section through the thread perpendicular to the thread axis will be elliptical in shape proportional to the degree that the axis of the whirling tool is skewed or tilted to the drill rod. Generally, a skew angle of 2° to 6° is sufficient to form a satisfactory reverse buttress thread.

FIG. 4 shows a sectional view of two sections of drill rod 10 and 11 and their mating coupling 12 with the reverse buttress thread form achieved by the method of this invention.

One of the features of a thread form in this manner is the selective use of either flank. As flank angle is decreased, the longitudinal force that can be applied with a fixed torque increases. Therefore, in a joint where one section has a small working flank angle, and the other a larger flank angle, the applied torque will subject the system to a compressive load determined by the small angle. The large flank angle will then require a higher torque to effect release. By combining both flank angles in a tool joint-coupling arrangement, joint tightness is determined by the torque between the two drill rods. Reversal of torque to disengage the joint causes the low flank angle joint to separate first, and as the two drill rods normally are vertical, the weight load of the system is in the same direction as the joint load initially and subsequent disengagement favors the low flank angle thread. This selective disengagement is a desirable feature in drill rods.

The feature of a smooth threaded surface which is commonly produced by the thread whirling technique and economy of manufacture combine to make this method especially attractive for the manufacturer of drill rods. However, the manufacturing method may be applied to any threaded member where the reverse buttress thread form or other non-symmetrical thread form is of use.

Although one embodiment of the method is shown, it should be obvious to one skilled in the art that the method may be applied to either internal or external threading of a cylindrical member or other stock form with equal results. It should also be obvious that the thread form may be obtained either by advancing the drill rod relative to the whirling tool and rotating the drill rod or by advancing the whirling tool relative to the drill rod while rotating the drill rod or in the alternative advancing the whirling tool while holding the drill rod steady and causing the parallel axis of advance to rotate about the axis of the drill rod.

It is to be understood that other arrangements are intended where the whirling axis and thread axis are not parallel and do not intersect.

It is not possible to present all of the potential variations of thread form now possible by this teaching as they will now be understood by those skilled in the art. It should be understood that the scope of invention is to be limited only by the scope of the claims.

I claim:

1. The method of generating a continuous non-symmetrical thread of a given pitch on a cylindrical workpiece by a modified process of thread whirling comprising:
   rotating the workpiece about a first axis corresponding to the axis of the workpiece;
   making a continuous cut around a surface of said cylindrical workpiece by means of a point cutting tool rotating about a second axis offset from and non-parallel to said first axis, said tool is in essentially continuous contact with said workpiece; and
   effecting relative linear motion between said workpiece and said rotating tool parallel to said first axis and in spaced relationship with the rotation of said workpiece corresponding to the pitch of the threaded form.

2. The method of claim 1 wherein the surface of the workpiece is the outer surface of a cylinder and the resulting thread is an external thread.

3. The method of claim 1 wherein the periphery is an internal surface of a hollow cylinder and the resulting thread is an internal thread.

4. The method of producing a reverse buttress threads of a given pitch having different locking and clearance flank angle comprising:
   rotating the workpiece about a first axis corresponding to the axis of the workpiece;
   making a continuous cut around a surface of said cylindrical workpiece by means of a point cutting tool rotating about a second axis offset from and non-parallel to said first axis, said tool is in essentially continuous contact with said workpiece; and
   effecting relative linear motion between said workpiece and said rotating tool parallel to said first axis and in spaced relationship with the rotation of said workpiece corresponding to the pitch of the thread formed.

5. The method of producing the external threads of a given pitch of a drill rod comprising:
   rotating the drill rod about a first axis corresponding to the axis of the drill rod;
   making a continuous cut around a surface of said cylindrical drill rod by means of a point cutting tool rotating about a second axis offset from and non-parallel to said first axis, said tool is in essentially continuous contact with said drill rod; and
   effecting relative linear motion between said drill rod and said rotating tool parallel to said first axis and in spaced relationship with the rotation of said drill rod corresponding to the pitch of the thread formed.

6. The method of producing the internal threads of a given pitch for a drill rod coupling comprising:
   rotating the coupling about a first axis corresponding to the axis of the coupling;
   making a continuous cut around a surface of said cylindrical coupling by means of a point cutter tool rotating about a second axis offset from and non-parallel to said first axis, said tool is in essentially continuous contact with said coupling; and
   effecting relative linear motion between said coupling and said rotating tool parallel to said first axis and in spaced relationship with the rotation of said coupling corresponding to the pitch of the thread formed.

* * * * *